United States Patent [19]

Park et al.

[11] Patent Number: 5,784,230
[45] Date of Patent: Jul. 21, 1998

[54] AUTOMATIC REVERSIBLE TAPE RECORDER

[75] Inventors: Hyun Seo Park; Jin Gwan Kim, both of Suwon-si, Rep. of Korea

[73] Assignee: Samsung Electro-Mechanics Co., Ltd., Kyongki-do, Rep. of Korea

[21] Appl. No.: 754,058

[22] Filed: Dec. 3, 1996

[30] Foreign Application Priority Data

Aug. 27, 1996 [KR] Rep. of Korea ............... 1996-35703

[51] Int. Cl.$^6$ .......................... G11B 15/02; G11B 15/48
[52] U.S. Cl. .......................................... 360/137; 360/96.2
[58] Field of Search .................................. 360/137, 96.2, 360/74.1

[56] References Cited

U.S. PATENT DOCUMENTS

| 4,591,932 | 5/1986 | Aratani | 360/74.1 |
|---|---|---|---|
| 4,603,358 | 7/1986 | Sakurai et al. | 360/74.1 |
| 5,031,475 | 7/1991 | Takai et al. | 360/137 X |

FOREIGN PATENT DOCUMENTS 60-138752  7/1985  Japan .

Primary Examiner—Stuart S. Levy
Assistant Examiner—William J. Klimowicz
Attorney, Agent, or Firm—Lowe Hauptman Gopstein & Berner

[57] ABSTRACT

An automatic reversible tape recorder is disclosed in which the functions of the keys for fast forward and rewinding are improved, and the manufacturing and assembling are rendered easier owing to the simple structure of the components. The tape recorder includes first and second manipulation levers 110 and 120 being capable of moving back and forth horizontally to make a magnetic head ascend or descend upon completion of displacements of a certain distance. The tape recorder further includes a tape running direction reversing member 130 for reversing the running direction of the tape, by fixing the first and second manipulation levers 110 and 120 upon completion of ascending or descending of the magnetic head 104 owing to advancements of the first and second manipulation levers 110 and 120, by being turned as much as a certain angle upon advancement of the second manipulation lever 120 as much as a certain distance, and by pushing a program lever 150 (which actuates a cam gear). In the present invention, the functions of FF and REW are improved, and the mentioned functions are carried out in a simple manner. Further, the manufacture and assembling of the tape recorder become easier. Further owing to the simple constitution of the direction reversing member, the price of the tape recorder can be lowered.

6 Claims, 7 Drawing Sheets

AUTOMATIC REVERSIBLE TAPE RECORDER

FIELD OF THE INVENTION

The present invention relates to a tape recorder for use in automobiles, in which the functions of the keys for fast forward, rewinding and reversing are improved with a simple structure. In particular, the present invention relates to an automatic reversible tape recorder which includes first and second manipulation levers for performing horizontal movements, and a direction reversing member with a pressing portion formed thereon so as to perform rotating movement by the help of the first and second manipulation levers, so that a tape program lever would be actuated.

DESCRIPTION OF THE PRIOR ART

Generally, in the known automatic reversible tape recorders, when the user selects one from among fast forward (to be called "FF" below) and rewinding (to be called "REW" below) buttons which are installed side by side horizontally, a tape direction reversing member installed in front of them receives pressure, and a connecting member connected to it is turned as much as a certain angle. Consequently, the tape direction reversing lever is pushed, so that the FF function, the REW function and the reversing function can be selectively executed.

An example of the conventional automatic reversible tape recorders is disclosed in Japanese Patent Publication No. Sho-60-138752, which is illustrated in FIG. 1. As shown in the drawing, a head coupling piece 3 is installed upon a base plate 2 of a tape recorder 1, and a magnetic head 4 is installed in such a manner that it can advance and withdraw. At both sides of the magnetic head 4, there are installed capstan shafts 5 which are connected to a capstan motor. The capstan shafts 5 are contacted to pinch rollers 6 which are capable of advancing and withdrawing. About the middle portion of the tape recorder 1, there are installed reel shafts 7 for driving a tape.

Further, as shown in FIGS. 2 and 3, above the magnetic head 4 and in order to press its end, there are installed a first manipulation member (FF lever) 11 and a second manipulation member (REW lever) in an advanceable and withdrawable manner. In the front, i.e., on one side of the first manipulation member 11, there is formed a guide slot 12 for receiving a bent portion 32 of a tape direction reversing member 31. On its lower side, there is formed an engaging protuberance 13. In front, i.e., on one side of the second manipulation member 21, there is formed another guide slot 22 symmetrically with the guide slot 12 of the first manipulation member 11. On its lower side, there is formed another engaging protuberance 23, while on the pressing portion of the tape direction reversing member 31, there is formed an engaging step 33.

Further, an engaging slot 42 is formed on a lock arm 41 which is elastically supported by a spring so as to fix the engaging protuberances of the manipulation members 11 and 21. A program arm 51 is pivotally installed coaxially with the lock arm 41, and a projecting step 24 is formed on the second manipulation member 21 so as to contact with a V shaped protuberance 52.

In this automatic reversible tape recorder, in order to operate it, the first manipulation member 11 is pressed. Then the engaging protuberance 13 advances together with the first manipulation member 11. Consequently, the engaging protuberance 13 is engaged with the engaging slot 42 of the lock arm 41 which is supported elastically by the spring. Consequently, the first manipulation member 11 is fixed, while the head coupling piece 3 withdraws. Owing to the withdrawal of the head coupling piece 3, the pinch rollers 6 withdraw integrally so as to be released from the contact with the capstan shaft 5. Consequently, the rotating load due to the contact between the capstan shaft 5 and the pinch roller 6 disappears, with the result that the running velocity of the tape increases. As a result, a FF operation is executed.

Further, if the second manipulation member (REW lever) is pressed, then owing to the straight movement of the second manipulation member 21, the engaging protuberance 23 advances integrally with the second manipulation member 21. Consequently, the engaging protuberance 23 is engaged with the engaging slot 42 of the lock arm 41 which is elastically supported by the spring, and therefore, the second manipulation member 21 is fixed. Then by rotating clockwise, the first manipulation member 11 is released from the operation. Under this condition, the projecting step 24 of the second manipulation member 21 advances to pass over the V shaped protuberance 52 of the program arm 51 so as to be fixed. At the same time, the program arm is made to pivot clockwise to push a cam gear so as to reverse its rotating direction during play.

Accordingly, owing to the withdrawal of the head coupling piece 3, the pinch rollers 6 withdraw together, with the result that the contacts with the capstan shafts 5 are released. As a result, the rotating load due to the contact between the capstan shaft 5 and the pinch roller is eliminated, with the result that the running velocity of the tape increases. Consequently, the REW operation is executed in the direction opposite to that of play.

In the above described operations, that is, in the FF and REW operations, many components are involved, and therefore, manufacturing of the components becomes difficult. Further, the constitution of the tape recorder becomes complicated, with the result that the price of the tape recorder is increased.

SUMMARY OF THE INVENTION

The present invention is intended to overcome the above described disadvantages of the conventional techniques.

Therefore it is an object of the present invention to provide a tape recorder for use in automobiles, in which the functions of the keys for fast forward, rewinding and reversing are improved with a simple structure, and the manufacturing and assembling of the components can be carried out in an easy manner, thereby making it possible to lower the price of the tape recorder.

In achieving the above object, the automatic reversible tape recorder according to the present invention includes:

first and second manipulation levers and being capable of moving back and forth horizontally to make said magnetic head ascend or descend upon completion of displacements of a certain distance; and a tape running direction reversing member for reversing the running direction of the tape, by fixing said first and second manipulation levers and upon completion of ascending or descending of the magnetic head owing to advancements of said first and second manipulation levers and, by being turned as much as a certain angle upon advancement of said second manipulation lever as much as a certain distance, and by pushing a program lever to actuates a cam gear.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
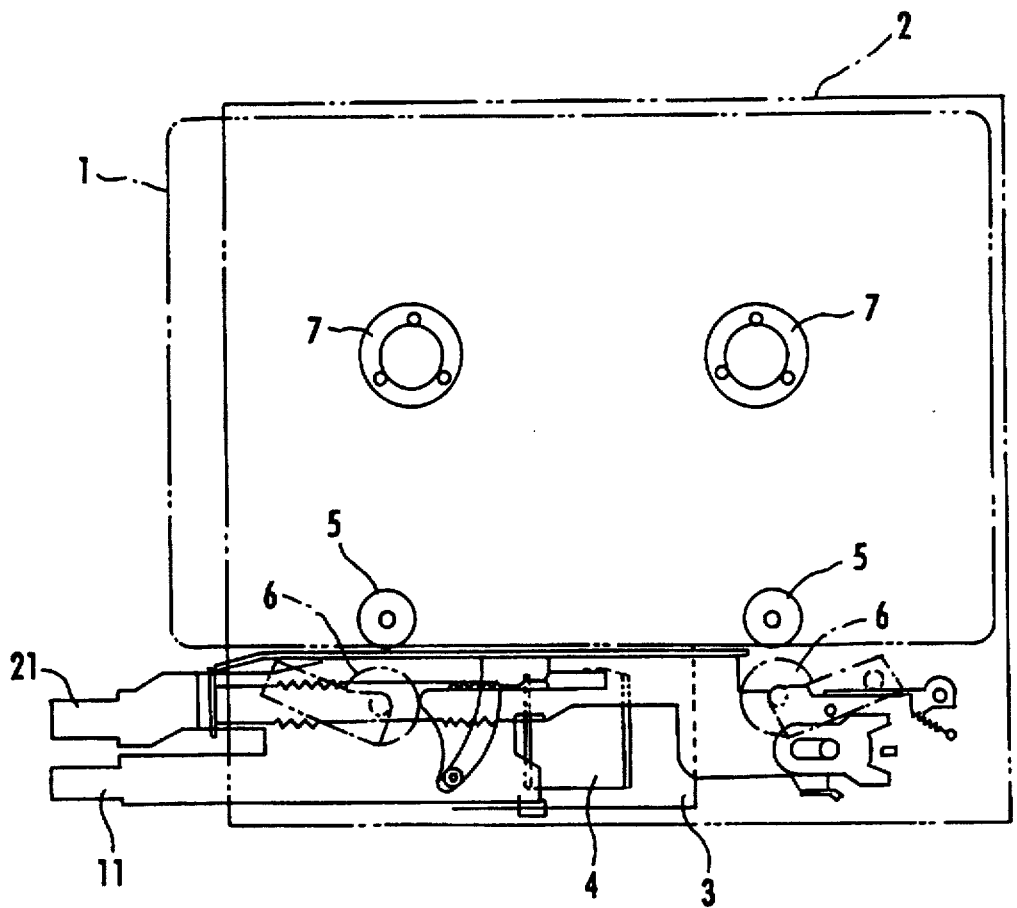
FIG. 1 is a plan view showing the mechanism of the general automatic reversible tape recorder.
Figure 2:
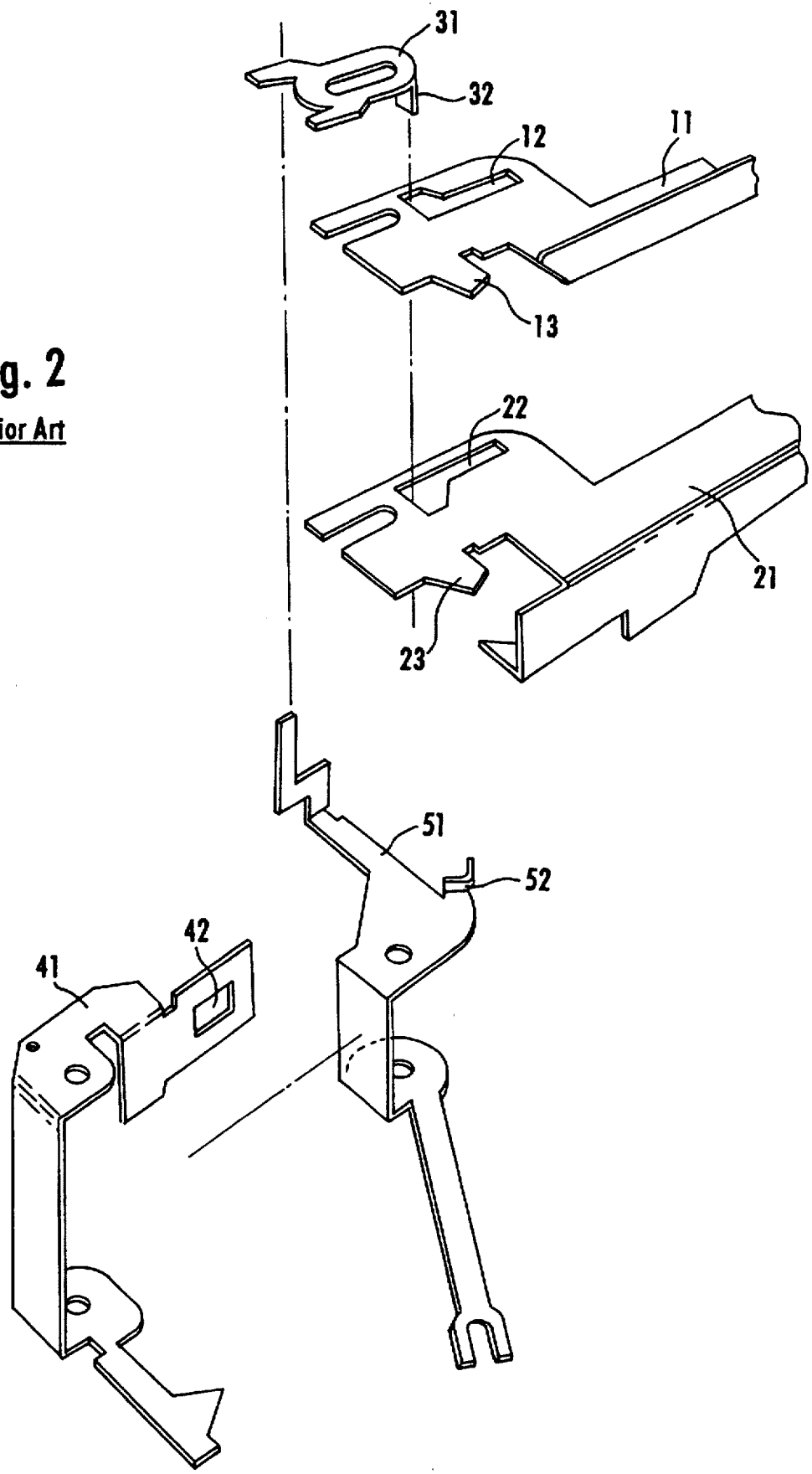
FIG. 2 is an exploded perspective view showing the critical portions of the conventional automatic reversible tape recorder.
Figure 3:
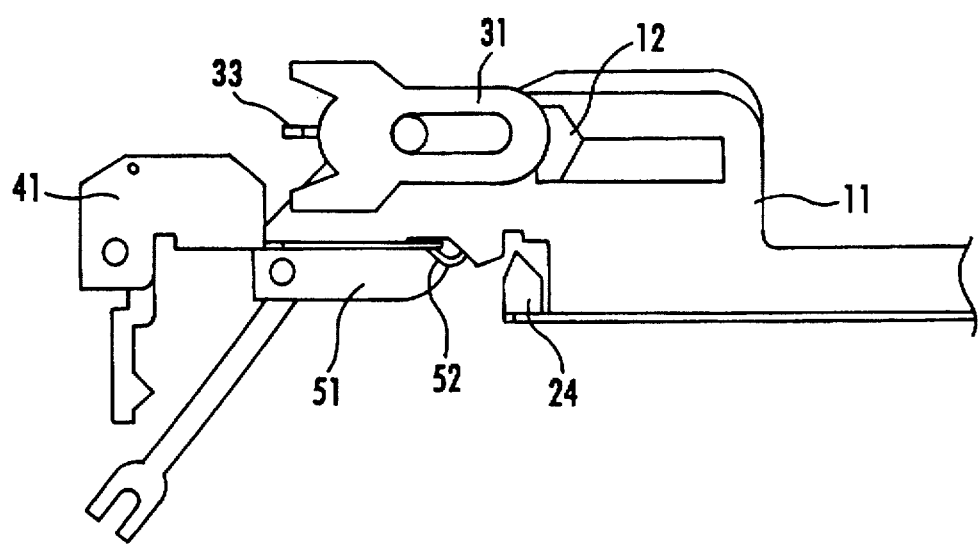
FIG. 3 illustrates the actuation of the tape recorder of FIG. 2.
Figure 4A:
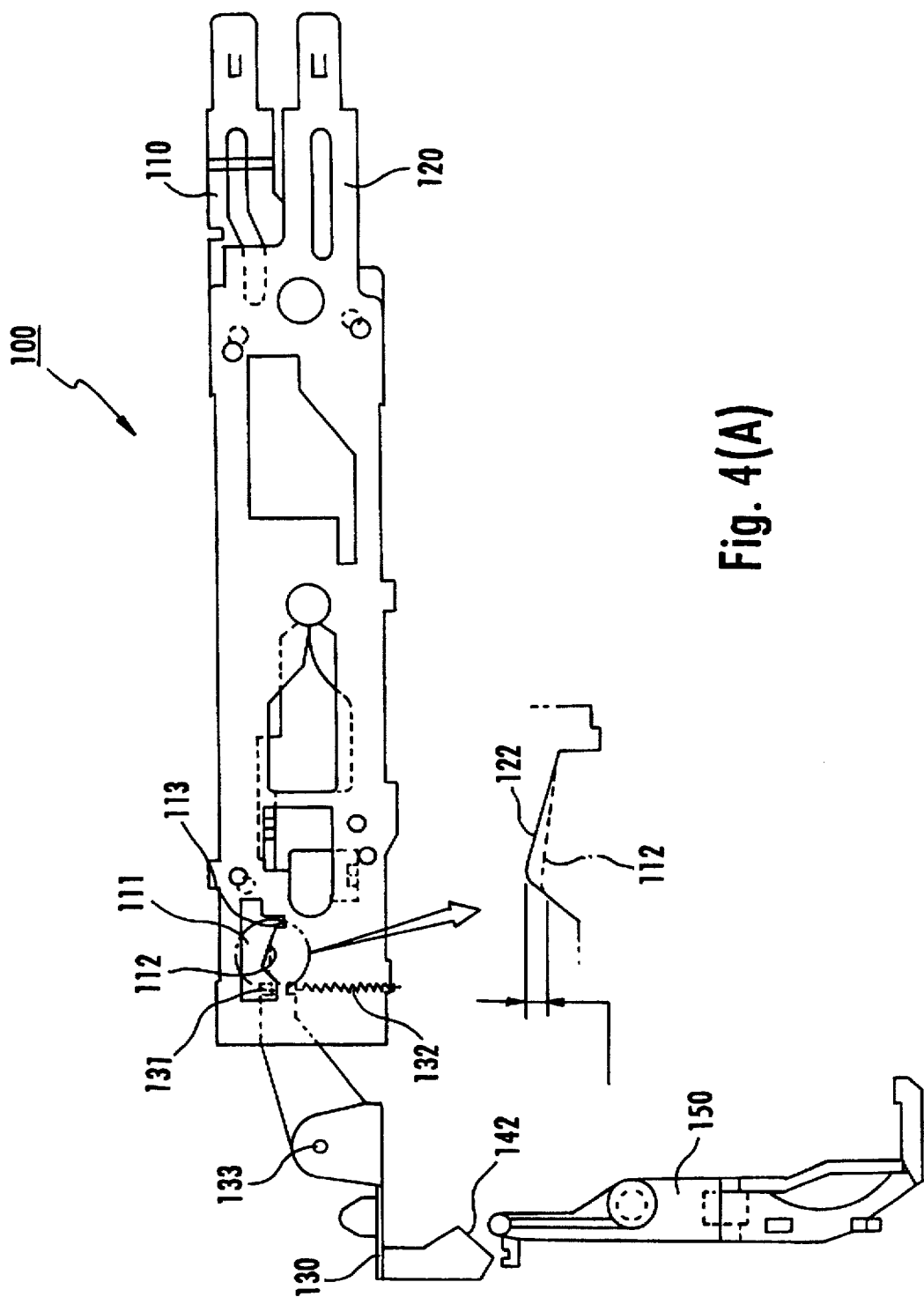
FIGS. 4A and 4B respectively illustrates the assembled state and the exploded state of the critical portions of the mechanism of the automatic reversible tape recorder according to the present invention.
Figure 4B:
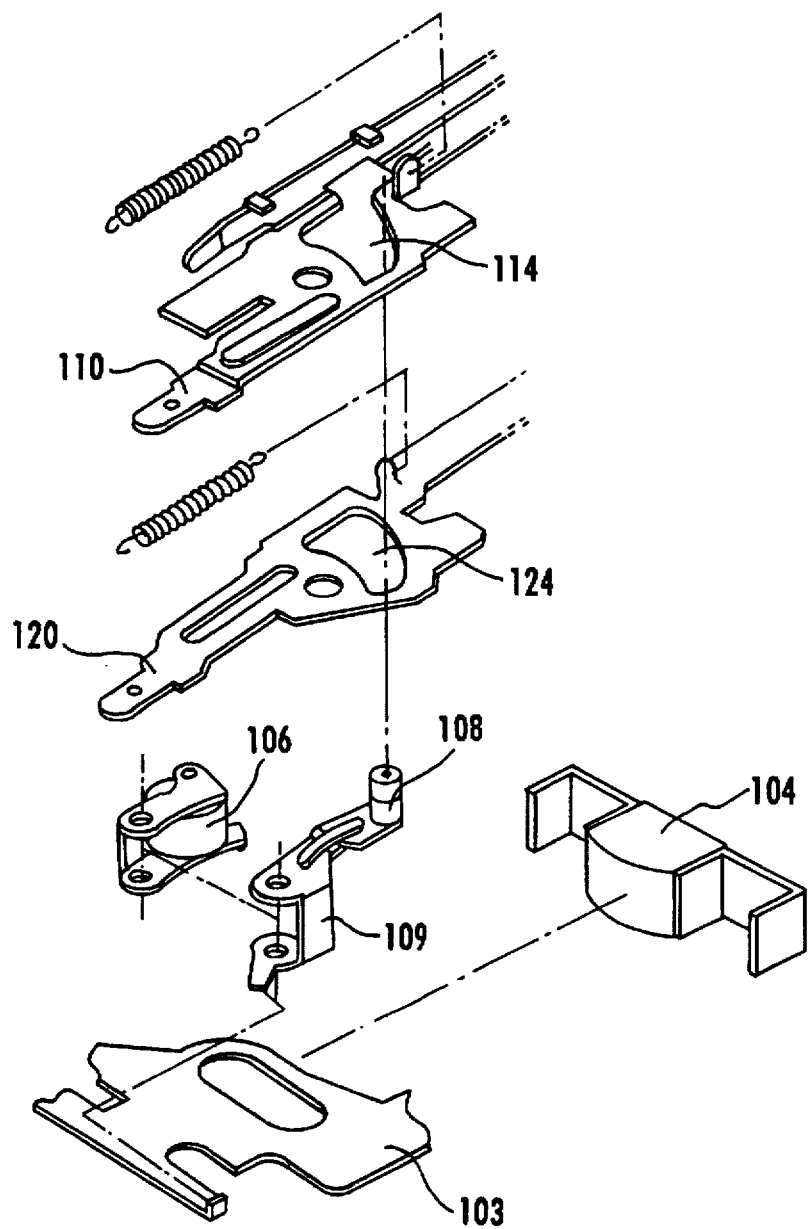
Figure 5:
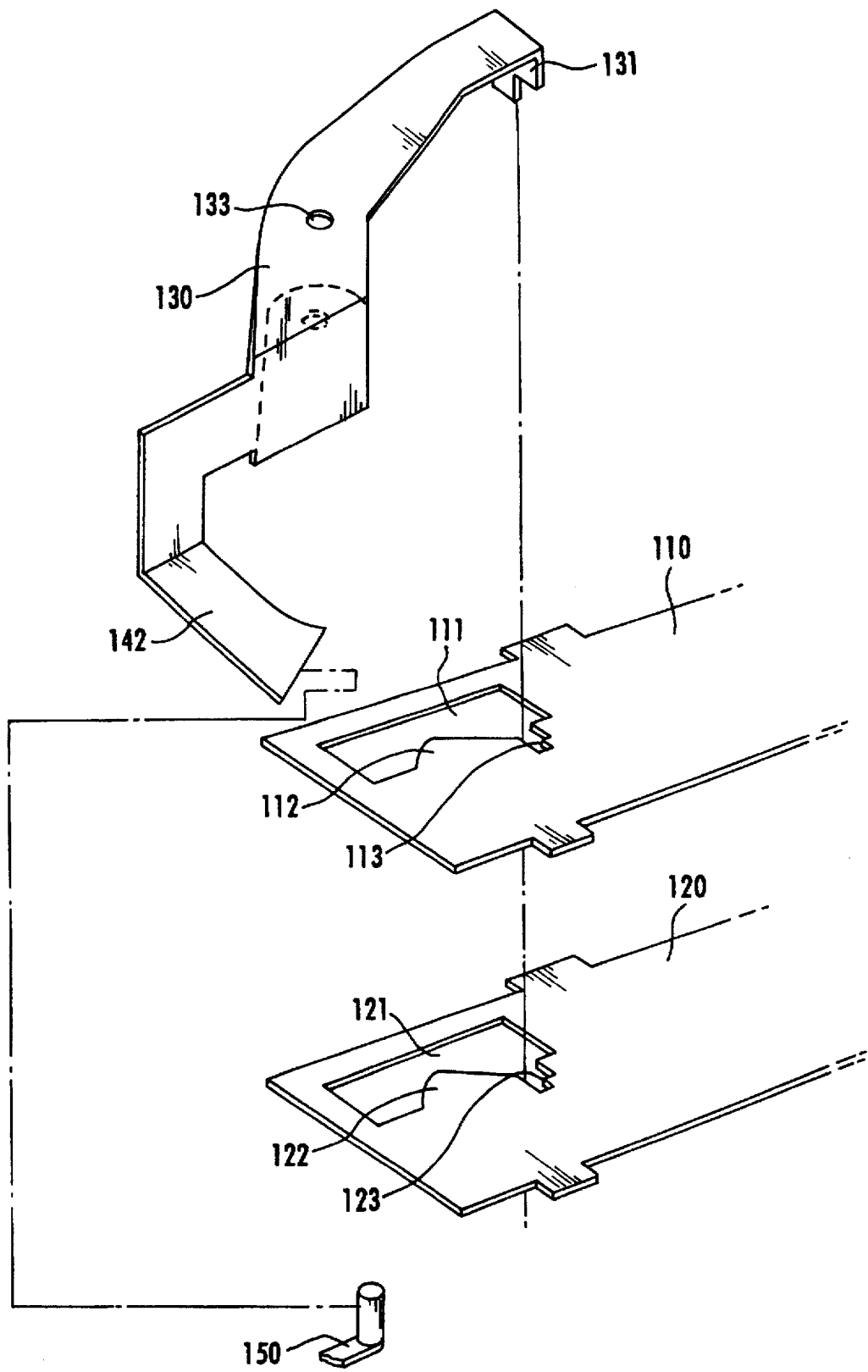
FIG. 5 is an exploded perspective view showing the tape running direction reversing member of the tape recorder according to the present invention.
Figure 6:
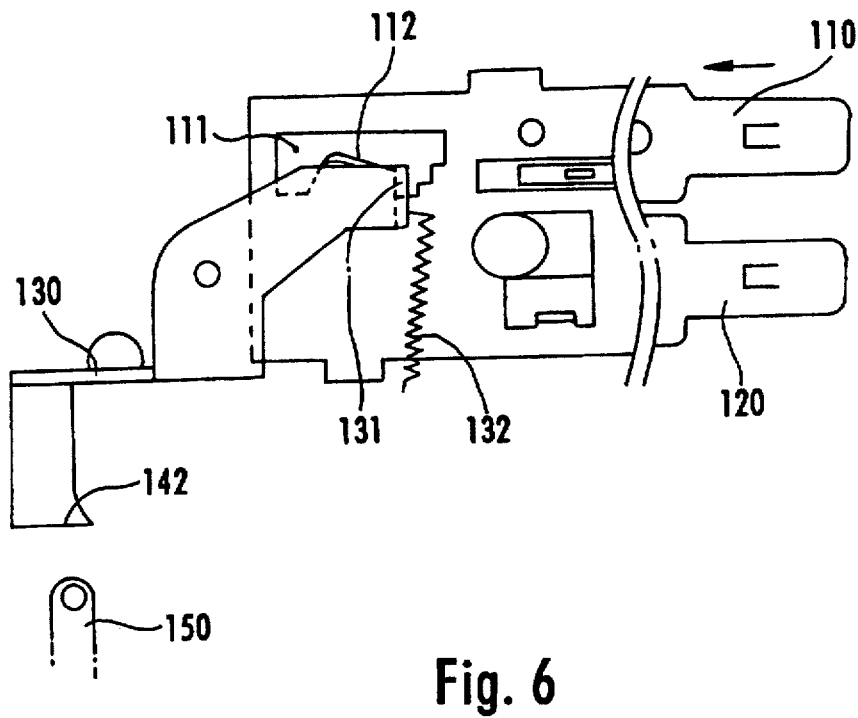
FIG. 6 illustrates the actuation of the tape recorder of FIG. 5.

FIGS. 4A and 4B respectively illustrate the assembled state and the exploded state of the critical portions of the mechanism of the automatic reversible tape recorder according to the present invention. FIGS. 5 and 6 are an exploded perspective view and an actuation showing the tape running direction reversing member of the tape recorder according to the present invention.

As shown in the drawings, a head coupling piece 103 for coupling with a magnetic head 104 is constituted as follows. That is, first and second manipulation levers 110 and 120 are installed in such a manner as to be movable back and forth horizontally in parallel with the head coupling piece 103. Owing to a carrying member 109 having a roller 108 which moves within guide slots 114 and 124, a pinch roller 106 together with the head coupling piece 103 and the magnetic head 104 move in the direction of crossing the manipulation levers 110 and 120. Thus the magnetic head 104 moves up and down.

Further, there is installed a tape running direction reversing member 130 for reversing the running direction of the tape, and this member 130 fixes the first and second manipulation levers 110 and 120 upon completion of ascending or descending of the magnetic head 104 owing to the advancement of the first and second manipulation levers 110 and 120. On the front portions of the first and second manipulation levers 110 and 120, there are formed guide slots 111 and 121, guide protuberances 112 and 122 within the guide slots, and engaging slots 113 and 123 at sides of the guide protuberances. An upper bent portion 131 of the tape running direction reversing member 130 is inserted into the guide slots 111 and 121 so as to be guided by guide protuberances 112 and 122. Then it is engaged into the engaging slots 113 and 123, thereby locking the manipulation levers 110 and 120.

The guide slots 111 and 121 and the guide protuberances 112 and 122 of the first and second manipulation levers 110 and 120 are designed in an inclined form such that the front heights of the guide protuberances 112 and 122 are higher than their rear heights as much as a certain length L. Therefore, during the advancement of the manipulation levers 110 and 120, the upper bent portion 131 of the tape running direction reversing member 130 is smoothly carried so as to be fixed into the engaging slots 113 and 123.

Further, the other end of the tape running direction reversing member 130 is elastically connected to a spring 132.

Further, the direction reversing member 130 is supported by a hinge shaft 133, and is provided with a carrying portion 142 on the bottom thereof for pushing a program lever 150 which actuates a cam gear.

The second embodiment of the present invention constituted as above will now be described as to its operation.

As shown in FIGS. 4 to 6, during the advancement of the first manipulation lever 110, the upper bent portion 131 of the direction reversing member 130 is inserted into the guide slot 111, is guided by the guide protuberance 112, and is engaged into the engaging slot 113, thereby locking the manipulation lever 110.

Thus the first manipulation lever 110 is fixed after advancement, and the head coupling piece 103 withdraws. Owing to the withdrawal of the head coupling piece 103, the pinch roller 106 withdraws together so as to be released from the contact with the capstan shaft. Therefore, the rotating load due to the contact between the capstan shaft and the pinch roller 106 disappears, and therefore, the running velocity of the tape increases. As a result, the tape apparatus performs the FF operation in the direction of play.

On the other hand, in the case where the REW operation is to be carried out by pressing the second manipulation lever 120, the actuation is done in the following manner. That is, owing to the advancement of the second manipulation lever 120, the guide slot 121 of it advances together, and therefore, the upper bent portion 131 of the direction reversing member 130 passes over the guide protuberance 122 of the guide slot 121. Then the portion 131 is fixed into the engaging slot 123 which is formed at a side of the guide protuberance 122. Under this condition, the guide protuberance 112 of the first manipulation lever 110 is released from the upper bent portion 131 of the direction reversing member 130, so that the locked state of the first manipulation lever 110 would be released.

Therefore, the upper bent portion 131 of the locking member 130 is inserted into the guide slot 121 again so as to be guided by the guide protuberance 122. Then the upper bent portion 131 is engaged into the engaging slot 123, thereby locking the second manipulation lever 120.

Figure 7:
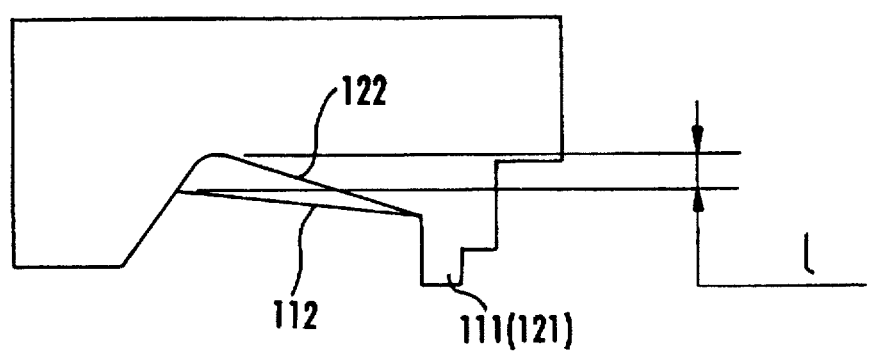
FIG. 7 illustrates the guide protuberances of the manipulation levers for actuating the direction reversing member according to the present invention.

As shown in FIG. 7, the guide slots 111 and 121 and the guide protuberances 112 and 122 of the first and second manipulation levers 110 and 120 are designed such that the height of the guide protuberance 122 of the second manipulation lever 120 is higher than that of the guide protuberance 112 of the first manipulation lever 110 as much as a certain length. Therefore, during the FF operation, the guide protuberance 112 cannot push the upper bent portion 131 of the direction reversing member 130, but the upper bent portion 131 of the direction reversing member 130 is pushed by the guide protuberance 122 of the second manipulation lever 120, thereby making it easier to reverse the running direction of the tape.

Therefore, the bent carrying portion 142 of the direction reversing member 130 pushes the program lever 150, and therefore, the program lever 150 is turned as much as a certain angle so as to make the cam gear actuated in the opposite direction, thereby carrying out the REW operation in the direction opposite to that of play.

According to the present invention as described above, the functions of FF and REW are improved, and the mentioned functions are carried out in a simple manner. Further owing to the simple constitution of the direction reversing member, the price of the tape recorder can be lowered.

In the above, the present invention was described based on the specific preferred embodiments, but it should be apparent to those ordinarily skilled in the art that various changes and modifications can be added without departing from the spirit and scope of the present invention which is defined in the appended claims.

What is claimed is:

1. An automatic reversible tape recorder comprising: a base plate; a magnetic head (104) operatively connected to the base plate; a capstan motor; pinch rollers (106); a head coupling piece (103) installed on the base plate to make the magnetic head advance and withdraw; a pair of capstan shafts installed at both sides of said magnetic head and connected to the capstan motor for contacting with the pinch rollers, said pinch rollers being capable of advancing and withdrawing together with said magnetic head; a reel shaft installed at a center of the tape recorder for driving a tape; first and second manipulation levers (110) and (120) movable back and forth horizontally in parallel with said head coupling piece; said first and second manipulation levers being respectively provided with guide slots (114) and (124) at rear portions thereof; a carrying member (109) having a roller (108) on an upper tip thereof coupled to said guide slots of said first and second manipulation levers; said head coupling piece moving said magnetic head and said pinch rollers up or down during pivoting of said roller (108) of said carrying member along said guide slots, said tape recorder further comprising:

said first and second manipulation levers being capable of moving back and forth horizontally to make said magnetic head ascend or descend upon completion of displacement by a predetermined distance; and a tape running direction reversing member (130), movably coupled at a distal end to guide slots (111) and (121) of said first and second manipulation levers, for reversing the running direction of the tape by fixing said first and second manipulation levers upon completion of ascending or descending of the magnetic head due to advancements of said first and second manipulation levers, by being turned through a predetermined angle upon advancement of said second manipulation lever through said predetermined distance, and by pushing a program lever (150) which actuates a cam gear, wherein said first and second manipulation levers are forward (FF) and reverse (REW) levers wherein the second reverse (REW) manipulation lever is adapted to effect the unlocking of the first forward (FF) manipulation lever from the tape running direction reversing member via a guide protuberance (122) provided within said guide slot (121) of said second reverse manipulation lever.

2. The automatic reversible tape recorder as claimed in claim 1, wherein said first manipulation lever is respectively provided with said guide slot (111) on a front portion thereof, a guide protuberance (112) slot within said guide slot, and with an engaging slot (113) at a side of said guide protuberance (112), whereby an upper bent portion (131) of said direction reversing member (130) is engaged into said engaging slot (113) so as to lock said first manipulation lever.

3. The automatic reversible tape recorder as claimed in claim 1, wherein said second manipulation lever is provided with said guide slot (121) on a front portion thereof, said guide protuberance (122) within said guide slot (121), and with an engaging slot (123) at a side of said guide protuberance (122), whereby an upper bent portion (131) of said direction reversing member (130) is engaged into said engaging slot (123) of said second manipulation lever member so as to lock said second manipulation lever.

4. The automatic reversible tape recorder as claimed in claim 1, wherein said tape running direction reversing member (130) is supported by a hinge shaft (133) and provided with a lower carrying portion (142) on a lower tip thereof in an integral form for pushing said program lever (150) to said cam gear.

5. The automatic reversible tape recorder as claimed in claim 1, wherein said first and second manipulation levers (112) and (120) respectively include guide protuberances (112) and (122) such that said guide protuberance (122) of said second manipulation lever is higher than said guide protuberance (112) of said first manipulation lever by a predetermined length.

6. The automatic reversible tape recorder as claimed in claim 1, wherein the other end of the tape running direction reversing member (130) is elastically connected to a spring 132.

* * * * *